C. P. BRADLEY.
MECHANICAL HORN.
APPLICATION FILED JAN. 29, 1915.
1,224,843.
Patented May 1, 1917.
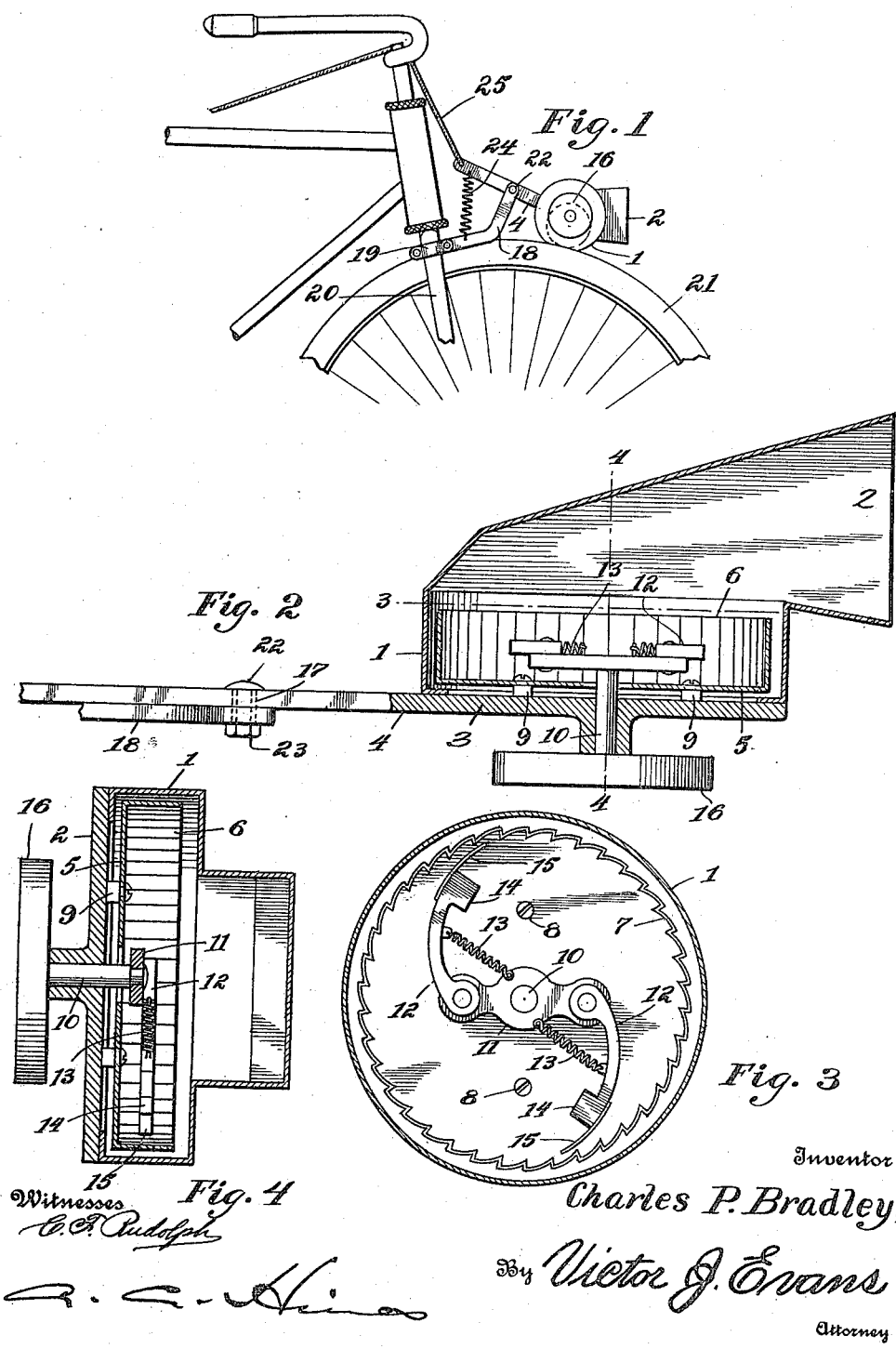
Charles P. Bradley,

UNITED STATES PATENT OFFICE.

CHARLES P. BRADLEY, OF PEMBERTON, NEW JERSEY.

MECHANICAL HORN.

1,224,843. Specification of Letters Patent. Patented May 1, 1917.

Application filed January 29, 1915. Serial No. 5,084.

*To all whom it may concern:*

Be it known that I, CHARLES P. BRADLEY, a citizen of the United States of America, residing at Pemberton, in the county of Burlington and State of New Jersey, have invented new and useful Improvements in Mechanical Horns, of which the following is a specification.

This invention relates to mechanical horns or sound producing devices designed particularly for use upon moving vehicles for signaling purposes, and the primary object of the invention is to provide a horn for bicycles, motorcycles and like vehicles, which is moved into and out of engagement with one of the tires or wheels of the vehicle so as to throw the horn into and out of action.

A further object of the invention is to provide a pivotally mounted and spring retracted horn which may be thrown into action in a ready and convenient manner by the rider or driver of the vehicle, and which embodies a novel construction of sound producing devices which may be of a kind to produce any desired kind of sound or note.

A still further object of the invention is to provide a mechanical horn which is simple of construction, reliable and efficient in action, and capable of being inexpensively manufactured and sold.

The invention consists of the features of construction, combination and arrangement of parts herein fully described and claimed, reference being had to the accompanying drawings in which:—

Figure 1 is a side elevation showing the application of the device to the front wheel fork of a bicycle.

Fig. 2 is a horizontal longitudinal section through the device on an enlarged scale.

Fig. 3 is a vertical section on the line 3—3 of Fig. 2.

Fig. 4 is a horizontal section through a portion of the horn taken on line 4—4 of Fig. 2.

In carrying my invention into practice, I provide a sound box or casing 1 which is provided at the front with a longitudinally extending sound outlet 2 and which is closed at the rear side by a back plate 3 from which extends a carrier arm 4.

Disposed within the casing is a metallic sound disk 5, preferably of circular form, and which is provided with an outwardly extending annular flange 6 formed to provide a series of sound tines or teeth 7 which, as in the structure shown in Figs. 1 to 4, inclusive may be ratchet-tooth shaped. The disk is secured to the back plate 3 by screws or other suitable fastenings 8 passing through spacing washers 9, so that the disk will be held apart from the elements of the casing to prevent any interference with its vibratory action and admitting of its sound producing qualities.

Journaled in and extending through the back plate 3 is a shaft 10, on the inner end of which is mounted a rotating body or element 11 carrying a pair of diametrically disposed and longitudinally curved shoes or brush arms 12, which are pivotally mounted to swing inward and outward toward and from the toothed surface of the sound disk and are normally held retracted or out of contact with the teeth or tines 7 by coiled retracting springs 13. The shoes or arms 12 are weighted, as shown at 14, and provided with reeds or wipers 15, made of metal, fiber or other suitable material, the construction being such that when rotary motion is imparted to the body 11 the weighted arms 12 will swing outward by centrifugal force against the resistance of their retracting springs, whereby the reeds or contact pieces 15 are caused to wipe over the tines or teeth 7 and thereby produce the desired sound or noise. On the outer end of the shaft 10 is a friction drive wheel 16 which is adapted to be moved into and out of contact with the tire or rim of the front wheel of the vehicle, as the tire of the front wheel of the bicycle or motorcycle, so that in the running of the vehicle rapid rotary motion will be imparted to the arms 12 causing them to quickly fly out and their reeds or fingers to run over the tines or teeth, thereby setting up a vibratory action resulting in the production of a sound or noise of the contemplated character or tone. When the wheel 16 is thrown out of engagement with the vehicle wheel and the motion of the shoes 12 ceases, these shoes are quickly retracted by their springs 13 and at once arrest or stop the noise producing action.

The mode of mounting the horn may vary as occasion requires, but in the present instance I have shown the carrier arm 4 pivotally mounted upon a sleeve or bushing 17 passing through openings in the arm 4 and a bracket member 18, which latter is secured by a clamp or other suitable fastening 19 to one of the fork arms 20 of the vehicle, so that the friction drive wheel 16 will be disposed in proper relation to the tire 21 of the vehicle wheel. The sleeve 17 is held in position by a bolt 22 and nut 23 which may be tightened to take up any lost motion from wear whenever desired. A coiled spring 24 connects the inner end of the arm 4 with the bracket arm 18 and is normally contracted and exerts its contractile energy to balance the weight of the horn proper and to hold the wheel 16 out of engagement with the tire 21. A cord or other operating connection 25 leads from the arm 4 to a convenient point by which the rider or driver may tilt the horn against the resistance of the spring 24 to throw the wheel 16 into engagement with the tire 21, as will be readily understood.

The mechanical horn, constructed as above described, may be produced and sold at a comparatively low cost, may be thrown into and out of action in a rapid and convenient manner, and may be of a character to give a sound of any range or tone, which may be of a soft and mellow character when desired.

I claim:—

1. A mechanical horn including a casing, a sound disk secured to the casing, a flange projecting laterally from said disk and provided with teeth, a rotary shaft arranged coaxially with the disk, a rotary body fixed to said shaft, curved arms pivotally connected with said rotary body on opposite sides of the shaft, weights upon the arms, spring wipers upon the arms to engage teeth of the flange, and springs for normally resisting outward movement of said arms beyond a predetermined degree.

2. A mechanical horn comprising a disk, a circular flange projecting laterally from the periphery of the disk, said flange being provided upon its inner surface with a continuous series of teeth, a shaft projecting through the disk and with which said flange is concentric, means for imparting rotary motion to said shaft, a support carried by the shaft, curved arms resiliently connected with the shaft, and resilient wipers carried by said arms to contact with the teeth.

3. A mechanical horn including a circular member provided with teeth, a rotary shaft arranged coaxially with said member, a rotary body fixed to said shaft, curved arms pivotally connected with said rotary body on opposite sides of the shaft, weights upon the arms, spring wipers upon the arms to engage the teeth of the circular member, and springs for normally resisting outward movement of said arms beyond a predetermined degree.

In testimony whereof I affix my signature in presence of two witnesses.

CHARLES P. BRADLEY.

Witnesses:
ANDREW B. CARLIN,
M. I. BRADLEY.

Copies of this patent may be obtained for five cents each, by addressing the "Commissioner of Patents, Washington, D. C."